US011958479B2

(12) United States Patent
Höfig et al.

(10) Patent No.: US 11,958,479 B2
(45) Date of Patent: Apr. 16, 2024

(54) METHOD, COMPUTER PROGRAM PRODUCT, CENTRAL CONTROL UNIT AND CONTROL SYSTEM FOR CONTROLLING AT LEAST PARTLY AUTOMATED VEHICLES IN A ROADWAY DANGER ZONE, IN PARTICULAR INTERSECTIONS OF ROADWAYS IN ROAD TRAFFIC

(71) Applicant: SIEMENS AKTIENGESELLSCHAFT, Munich (DE)

(72) Inventors: Kai Höfig, Rohrdorf (DE); Cornel Klein, Oberhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 429 days.

(21) Appl. No.: 17/415,414

(22) PCT Filed: Dec. 17, 2019

(86) PCT No.: PCT/EP2019/085705
§ 371 (c)(1),
(2) Date: Jun. 17, 2021

(87) PCT Pub. No.: WO2020/127309
PCT Pub. Date: Jun. 25, 2020

(65) Prior Publication Data
US 2022/0063606 A1 Mar. 3, 2022

(30) Foreign Application Priority Data

Dec. 19, 2018 (EP) .................................... 18214063
Dec. 19, 2018 (EP) .................................... 18214065
Dec. 19, 2018 (EP) .................................... 18214067

(51) Int. Cl.
*B60W 30/09* (2012.01)
*G08G 1/16* (2006.01)

(52) U.S. Cl.
CPC ............. *B60W 30/09* (2013.01); *G08G 1/164* (2013.01)

(58) Field of Classification Search
CPC ......... G08G 1/017; G08G 1/16; B60W 30/18; B60W 30/09; G05D 1/02
See application file for complete search history.

(56) References Cited

U.S. PATENT DOCUMENTS 9,442,489 B2    9/2016   Reichel et al.
10,269,250 B2   4/2019   Altinger et al.
(Continued)

FOREIGN PATENT DOCUMENTS

CN    103177596 A    6/2013
CN    108877268 A    11/2018
(Continued)

OTHER PUBLICATIONS

"Handshaking", Wikipedia, Version v. 25 3. 18.
International Search Report and Written Opinion in corresponding PCT Patent Application No. PCT/EP2019/085705 dated Apr. 8, 2021. 22 pages.
(Continued)

*Primary Examiner* — Tan Q Nguyen
(74) *Attorney, Agent, or Firm* — Schmeiser, Olsen & Watts LLP

(57) ABSTRACT

In order to control at least partially automated vehicles in a road danger zone, in particular road junctions in road traffic, in such a way that the vehicles can pass through the road danger zone in flowing traffic without stop/start interruptions, such as those caused e.g. by signalling equipment, traffic lights, the following proposes the following steps: a) each vehicle of the vehicles, on approaching the road danger (Continued)

zone, surrender the power to control the dynamic driving tasks of the vehicle in order to pass through said zone, b) when the vehicles have surrendered vehicle control power, a central control entity generates a digital road danger zone twin, and, as a result of the vehicles having surrendered vehicle control power, vehicle movements of the vehicle are automatically and dynamically controlled in a vehicle-co-ordinated and collision-free manner in order to pass through the road danger zone.

16 Claims, 6 Drawing Sheets

(56) References Cited

U.S. PATENT DOCUMENTS

| | | | | |
|---|---|---|---|---|
| 10,685,561 | B2 | 6/2020 | Zydek et al. | |
| 2013/0018572 | A1 | 1/2013 | Jang | |
| 2013/0304279 | A1* | 11/2013 | Mudalige | G08G 1/164 |
| | | | | 701/2 |
| 2014/0278029 | A1* | 9/2014 | Tonguz | G08G 1/161 |
| | | | | 701/117 |
| 2015/0286219 | A1* | 10/2015 | Reichel | G08G 1/163 |
| | | | | 701/23 |

FOREIGN PATENT DOCUMENTS

| | | |
|---|---|---|
| DE | 102012021282 A1 | 4/2014 |
| DE | 102015219467 A1 | 4/2016 |
| DE | 102015002405 A1 | 8/2016 |
| DE | 102016200217 A1 | 7/2017 |

OTHER PUBLICATIONS

Extended European Search Report in related European Patent Application No. 18214063.2 dated Jul. 17, 2019. 14 pages.

Chen, Lei, et al. "Cooperative Intersection Management: A Survey," IEEE Transactions on Intelligent Transportation Systems, IEEE, Piscataway, NJ, USA, vol. 17, No. 2, pp. 570-586, XP011597405, ISSN: 1524-9050, DOI: 10.1109/TITS.2015.2471812; [gefunden am Jan. 29, 2016]; the whole document; 2016; 17 pages.

Abdelhameed, Magdy M., et al. "Development and evaluation of a multi-agent autonomous vehicles intersection control system," 2014 International Conference on Engineering and Technology (ICET), IEEE, pp. 1-6, XP032725758, DOI: 10.1109/ICENGTECHNOL. 2014.7016754; the whole document; 2014; 6 pages.

Tachet, Remi, et al. "Revisiting Street Intersec-tions Using Slot-Based Systems," Online PLoS One 11(3): e0149607 and https://doi.org/10.1371/journal.pone.0149607, Mar. 16, 2016; 2016; 9 pages.

* cited by examiner

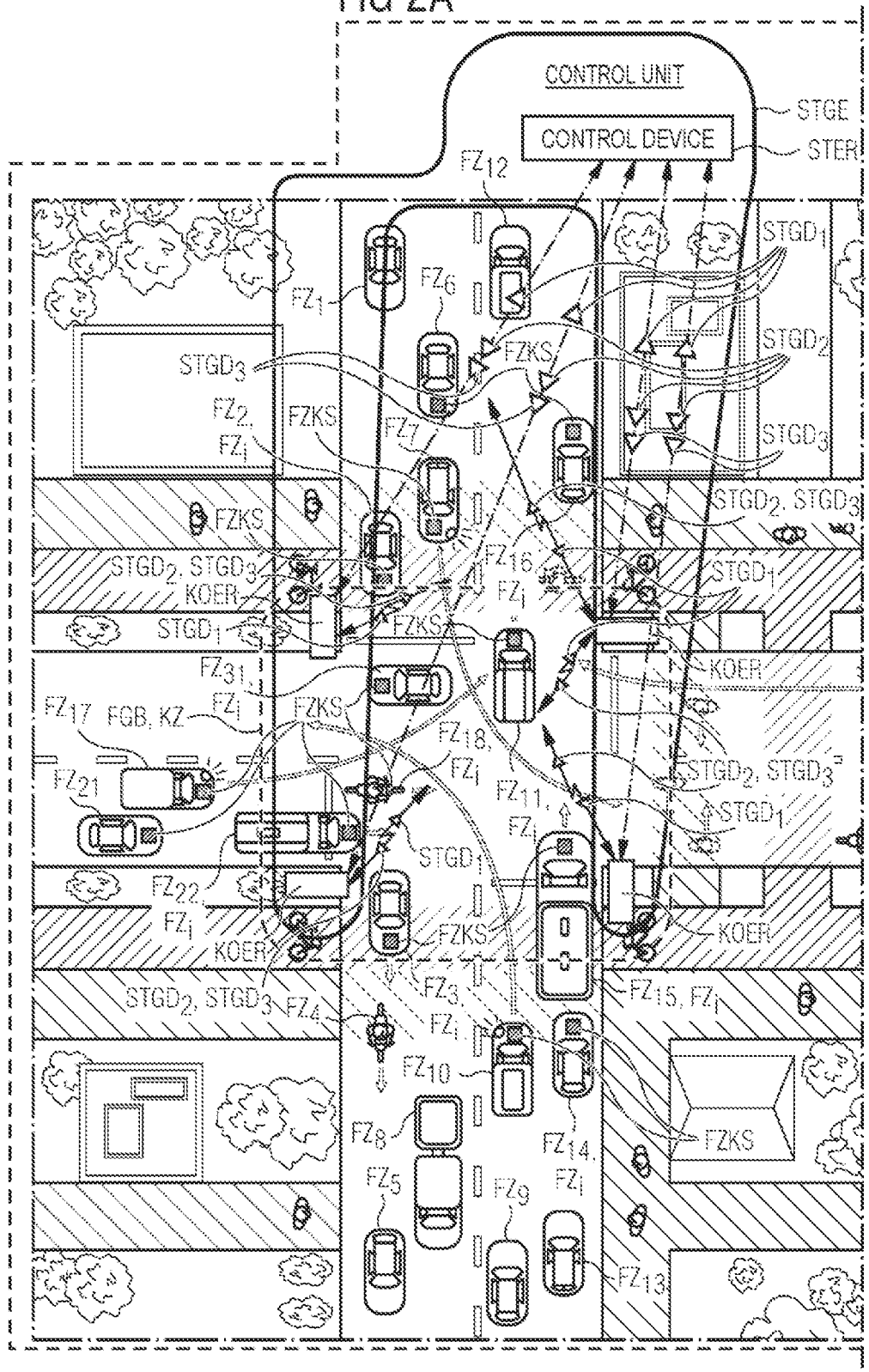

METHOD, COMPUTER PROGRAM PRODUCT, CENTRAL CONTROL UNIT AND CONTROL SYSTEM FOR CONTROLLING AT LEAST PARTLY AUTOMATED VEHICLES IN A ROADWAY DANGER ZONE, IN PARTICULAR INTERSECTIONS OF ROADWAYS IN ROAD TRAFFIC

CROSS-REFERENCE TO RELATED APPLICATIONS

This application is a national stage entry of PCT Application No. PCT/EP2019/085705 having a filing date of Dec. 17, 2019, which claims priority to European Patent Application No. 18214063.2, having a filing date of Dec. 19, 2018, and European Patent Application No. 18214065.7, having a filing date of Dec. 19, 2018, and European Patent Application No. 18214067.3, having a filing date of Dec. 19, 2018, the entire contents of which are hereby incorporated by reference.

FIELD OF TECHNOLOGY

The following relates to a method for controlling at least partly automated vehicles in a roadway danger zone, in particular intersections of roadways in road traffic, a computer program product for controlling at least partly automated vehicles in a roadway danger zone, in particular intersections of roadways in road traffic, a central control unit for controlling at least partly automated vehicles in a roadway danger zone, in particular intersections of roadways in road traffic, and a control system for controlling at least partly automated vehicles in a roadway danger zone, in particular intersections of roadways in road traffic.

BACKGROUND

A danger zone in road traffic is a zone where there is danger, defined as the possibility of a person, a thing, an animal, or even a natural resource at least temporally and/or spatially encountering a source of danger as a potential source of harm. This is generally the case in the roadway zone, which is why the term roadway danger zone is also employed. On the basis of these definitions, a typical, albeit not the only, roadway danger zone in road traffic is the zone where one or more vehicles meet—the roadway intersection, or intersection for short.

In or at intersections, conflicts of interest can occur among the road users wanting to traverse the intersection at the same time. There is therefore a need for regulation. For this reason, intersections are currently protected by traffic signs, e.g. signaling signs in the form of traffic lights, or by traffic rules.

FIG. 1 shows, in a basic diagram, the present-day situation for the regulation of roadway traffic, e.g. road traffic, in roadway danger zones FGB in the form of a "double-T" intersection KZ* or "T" intersection KZ**. The basic diagram reveals a number m of motorized vehicles $FZ_1 \ldots FZ_m$ where e.g. m=37, which vehicles as road users have to move with further road users, such as cyclists and pedestrians, in road traffic and pass through the roadway danger zones or intersections FGB, KZ*, KZ** in the process. In order to control the traffic flow in these roadway danger zones or intersections FGB, KZ*, KZ**, there are a multiplicity of current traffic regulation measures, such as e.g. the traffic lights already mentioned above, road signs, crosswalks for pedestrians, crossings for pedestrians/cyclists, etc., all of which apart from road signs are illustrated in FIG. 1.

In this regard, at the "double-T" intersection KZ* all road users moving in the "NORTH→SOUTH or SOUTH→NORTH" direction can pass through the intersection KZ* because the traffic lights for these road users are showing the green signal, whereas all road users moving in the "WEST→EAST or EAST→WEST" direction cannot pass through the intersection KZ*, that is to say must wait e.g. at or before the traffic lights, because the traffic lights for these road users are showing the red signal.

The situation is different at the "T" intersection KZ**. There the road users moving in the "WEST→EAST or EAST→WEST" direction or in the NORTH direction, on account of the traffic lights with a green signal or no signal (applies to the vehicles $FZ_{35}$, $FZ_{36}$ traveling in the NORTH direction), are authorized to pass through the intersection or to carry on moving, whereas the road users traveling in the "SOUTH" direction must wait at or before the traffic lights because the traffic lights for these road users are showing the red signal.

As far as the automation of the motorized vehicles $FZ_1 \ldots F_{37}$ in the basic diagram is concerned, which vehicles are traveling e.g., as illustrated, as automobiles and trucks with different vehicle lengths and engine powers and as a motorcycle in road traffic, then—as per the situation today—against the background of the autonomy levels defined by SAE International (formerly: Society of Automotive Engineers) in the published specification SAE J3016 for motorized road vehicles with control systems for autonomous driving, which is classified in six SAE levels (level "0" to level "5") from no automation (level "0"), assistance support (level "1"), partial automation (level "2"), conditional automation (level "3"), high automation (level "4") to full automation (level "5"), it should be noted that the vehicles $FZ_1 \ldots F_{36}$ illustrated should be assigned to level "0" or level "1" almost without exception, apart from a few that could be allocated to level "2".

If the intention then is to control at least partly automated vehicles within the meaning of the present invention in the roadway danger zone FGB, KZ, KZ', in accordance with the SAE definition of autonomy levels, in principle, only vehicles of classification levels "3" to "5" and possibly also those of level "2" would be appropriate for this.

How might such vehicle control of a least partly automated vehicles in roadway danger zones in road traffic now be manifested when the abovementioned traffic regulation measures, such as e.g. traffic lights, which have shaped the streetscape in the industrial age are no longer instrumental for a future traffic concept in the digital age?

In accordance with a proposal by the team of authors "Tachet Remi; Santi Paolo, Sobolevsky Stanislav; Reyes-Castro, Luis Ignacio; Frazzoli, Emilio, Helbing, Dirk; Ratti, Carlo" entitled "Revisiting Street Intersections Using Slot-Based Systems", published on Mar. 16, 2016 in the online journal PLoS ONE 11(3): e0149607 and https://doi.org/10.1371/journal.pone.0149607, the traffic flow of autonomously driving vehicles in future road traffic is intended to be controlled smoothly and with less environmental pollution (keywords: exhaust gas emissions) with the aid of a smart control system named "Light Traffic" in an intelligent way at road traffic intersections, without the continuing use of traffic lights. The central concept of this "Light Traffic" proposal is based on the approach of allocating to each autonomous vehicle a time slot for passing through the intersection, e.g. a four-way intersection. In this way, the vehicles advance without delay in the intersection zone precisely when a time slot becomes free. This would make it possible not only to increase the traffic flow but also to significantly reduce $CO_2$ emissions because, firstly, significantly more vehicles (approximately twice as many vehicles) in comparison with conventional traffic light control at an intersection could pass through the latter and, secondly, this virtually eliminates waiting times at a standstill such as still arise at traffic lights governed by conventional traffic light control systems of intersections.

However, a prerequisite for such a concept is that, firstly, the traffic infrastructure be adapted, e.g. by means of expensive construction measures in towns and cities (e.g. description of FIG. 2), and, secondly, vehicles participating in traffic be virtually exclusively autonomously operated vehicles which are additionally equipped with the most modern communication and sensor technology.

The subsequently published DE patent application (application number: 10 2018 209 790.9) discloses a control device for controlling a vehicle in a danger zone, said control device being an ascertaining unit for ascertaining whether the vehicle is situated in the danger zone or in a transition zone adjacent to the danger zone;

a communication unit for receiving vehicle data from the vehicle if the ascertaining unit ascertains that the vehicle is situated in the danger zone or in the transition zone; and a determining unit for determining a trajectory for the vehicle taking account of the received vehicle data in order to guide the vehicle through the danger zone without collisions;

a device which is associated with the danger zone and which performs the control of the vehicles in the danger zone, wherein collisions in the danger zone can be prevented.

SUMMARY

An aspect relates to a method, a computer program product, (non-transitory computer readable storage medium having instructions, which when executed by a processor, perform actions), a central control unit and a control system for controlling at least partly automated vehicles in a roadway danger zone, in particular intersections of roadways in road traffic, in which the vehicles are controlled in such a way that they can pass through the roadway danger zone in flowing traffic without stop/start interruptions such as are caused for example by signaling equipment, traffic lights.

The present patent application takes as a basis here the normal case in which the at least partly automated vehicles pass through the roadway danger zone or the intersection without any special feature as far as the vehicle property and driving behavior in the danger/intersection zone are concerned. By contrast, if a special feature is present because e.g.—special case 1—the at least partly automated vehicle wanting to pass through the roadway danger zone or the intersection has an excessive vehicle length or—special case 2—the at least partly automated vehicle wanting to pass through the roadway danger zone or the intersection is intending to change roadway in the danger/intersection zone, then adapted vehicle control is required in the aforementioned special cases vis-à-vis the normal case dealt with in the present patent application. The way in which this adaptation in vehicle control is manifested for the two special cases is dealt with in further, simultaneously filed patent applications.

With regard to special case 1, that is the European patent application (application No. 18214065.7-1203) entitled "Method, computer program product, central control unit and control system for controlling at least partly automated vehicles, proportionately having excessive vehicle lengths, in a roadway danger zone, in particular intersections of roadways in road traffic", the content of which is hereby included and disclosed in the present patent application.

With regard to special case 2, that is the European patent application (application No. 18214067.3-1012) entitled "Method, computer program product, central control unit and control system for controlling at least partly automated vehicles, proportionately having intentions to change roadways, in a roadway danger zone, in particular intersections of roadways in road traffic", the content of which is hereby included and disclosed in the present patent application.

The concept underlying the present invention in accordance with the technical teaching is that, for controlling at least partly automated vehicles in a roadway danger zone, in particular intersections of roadways in road traffic, the vehicles, upon approaching the roadway danger zone, in each case surrender a vehicle control power for the vehicle control of dynamic driving tasks in order to pass through said zone, once the vehicles have surrendered the vehicle control powers, a central control entity generates a digital roadway danger zone twin, by means of which, owing to the vehicle control powers having been surrendered, vehicle movements of each vehicle of the vehicles for passing through the roadway danger zone are controlled automatically, dynamically, in a vehicle-coordinated manner and in a collision-free manner.

With control of at least partly automated vehicles in the roadway danger zone that is carried out in this way, the traffic no longer needs to be interrupted. Furthermore, traffic regulation measures such as e.g. traffic lights, road signs, crosswalks for pedestrians, etc., are no longer required. Furthermore, there is no need for a fixedly predefined vehicle movement direction. Rather the latter, just like the vehicle speed, when passing through the roadway danger zone, can be dynamically adapted depending on the traffic situation.

In this case, the vehicle control powers are surrendered with the aid of first control data communicated to the central control entity by each vehicle upon approaching the roadway danger zone.

The control of the vehicle movements of each vehicle of the vehicles owing to the vehicle control powers having been surrendered is effected with the aid of second control data communicated to each vehicle by the central control entity for the purpose of passing through the roadway danger zone.

In this case, the central control entity is a central control unit consisting of a control device comprising a computer program product having a nonvolatile, readable memory, in which processor-readable control program instructions of a program module that carries out the vehicle control are stored, and a processor, which is connected to the memory and which executes the control program instructions of the program module for vehicle control, a control interface and at least one communication device, which in terms of communication technology either is connected to the control device and to the computer program product therein via the control interface or is assigned to the control device and the computer program product therein.

In accordance with the "or" option, the control device is and advantageously embodied as an open cloud computing platform.

In both cases the communication device is arranged in the roadway danger zone in such a way that, for the purpose of vehicle control, said communication device is in each case connected to a vehicle communication interface contained in each of the vehicles. This connection inherently employs radiotechnology, and so it is embodied e.g. according to a mobile radio standard of the 5G generation. In the roadway danger zone, e.g. in a "double-T" intersection (cf. FIGS. 1 and 2), the number of communication devices consists of four individual communication devices positioned at all four corners of the intersection in order always to have an optimum radio connection to the vehicles or the respective vehicle communication interface.

Dynamically, in a vehicle-coordinated manner and in a collision-free manner in the context of the present invention means here that the vehicle movements of the respective vehicle are coordinated with driving movements of the other vehicles in the roadway danger zone by means of the digital roadway danger zone twin at every location and at every point in time such that the respective vehicle passes through the roadway danger zone without any collision with the other vehicles. With the aid of the digital roadway danger zone twin, therefore, each vehicle is moved according to a spatio-temporal movement pattern in the roadway danger zone in such a manner as to ensure that all vehicles in the roadway danger zone which have surrendered the vehicle control power for vehicle control of the dynamic driving tasks can pass through said zone in a collision-free manner.

In the case of this type of vehicle control, in accordance with one development of the present invention, it is advantageous that already in advance when each vehicle is approaching the roadway danger zone, the surrender of the vehicle control power is agreed by means of a handshake protocol between the respective vehicle and the central control entity. The first control data are then also communicated in the course of this handshake protocol.

Furthermore, in accordance with a further development of the vehicle control according to the present invention, it is advantageous that vehicle trajectory and vehicle speed of each vehicle of the vehicles are ascertained for the generation of the digital roadway danger zone twin for vehicle control owing to the vehicle control powers having been surrendered.

Furthermore, for the development of the vehicle control according to the present invention, it is expedient that with the generation of the digital roadway danger zone twin, vehicle travel information regarding from and in which travel directions the vehicles are moving toward the roadway danger zone in order to pass through the latter is represented digitally in a grid format having format fields alternating in a checkered fashion.

In the case of this advantageous, checkered representation, as far as the coordination during vehicle control is concerned, a core zone of the grid format represents the roadway danger zone and first format fields of the grid format in a manner depending on format field alternation represent either "WEST→EAST and/or EAST→WEST" vehicle movement directions or "NORTH→SOUTH and/or SOUTH→NORTH" vehicle movement directions and second format fields of the grid format in a manner depending on format field alternation represent either "NORTH→SOUTH and/or SOUTH→NORTH" vehicle movement directions or "WEST→EAST and/or EAST→WEST" vehicle movement directions with in each case at most one vehicle per first format field and second format field, respectively.

For the vehicle control carried out on the basis of the digital roadway danger zone twin, each vehicle movement of the vehicle for passing through the roadway danger zone owing to the vehicle control powers having been surrendered is controlled automatically, dynamically, in a vehicle-coordinated manner and in a vehicle-collision-free manner by virtue of the fact that in a manner corresponding to the situation in the roadway danger zone the vehicle in the core zone of the grid format in accordance with a digital movement with a START point and a TARGET point in the grid format, which digital movement is based on a format field alternation, is digitally moved either from a first format field of the first format fields as the START point of the digital movement to a neighboring second format field of the second format fields as the TARGET point of the digital movement, which second format field does not represent any vehicle of the vehicles—that is to say is digitally free for the digital movement—, or from a second format field of the second format fields as the START point of the digital movement to a neighboring first format field of the first format fields as the TARGET point of the digital movement, which first format field does not represent any vehicle of the vehicles—that is to say is digitally free for the digital movement.

When, with a last digital movement in the grid format, the vehicle digitally leaves the core zone of the grid format and it has thus passed through the roadway danger zone, then for the advantageous development of the vehicle control according to the present invention the vehicle control power is returned to each vehicle by the central control entity. This can be achieved simply and advantageously with the aid of a further handshake protocol. In the course of this further handshake protocol, third control data initiating the return of the vehicle control power are then communicated to the vehicle.

BRIEF DESCRIPTION

Some of the embodiments will be described in detail, with reference to the following figures, wherein like designations denote like members, wherein:

FIG. 2A depicts, on the basis of FIG. 1, a control system for controlling at least partly automated vehicles in a roadway danger zone, in particular intersections of roadways in road traffic;

DETAILED DESCRIPTION

Figure 1:
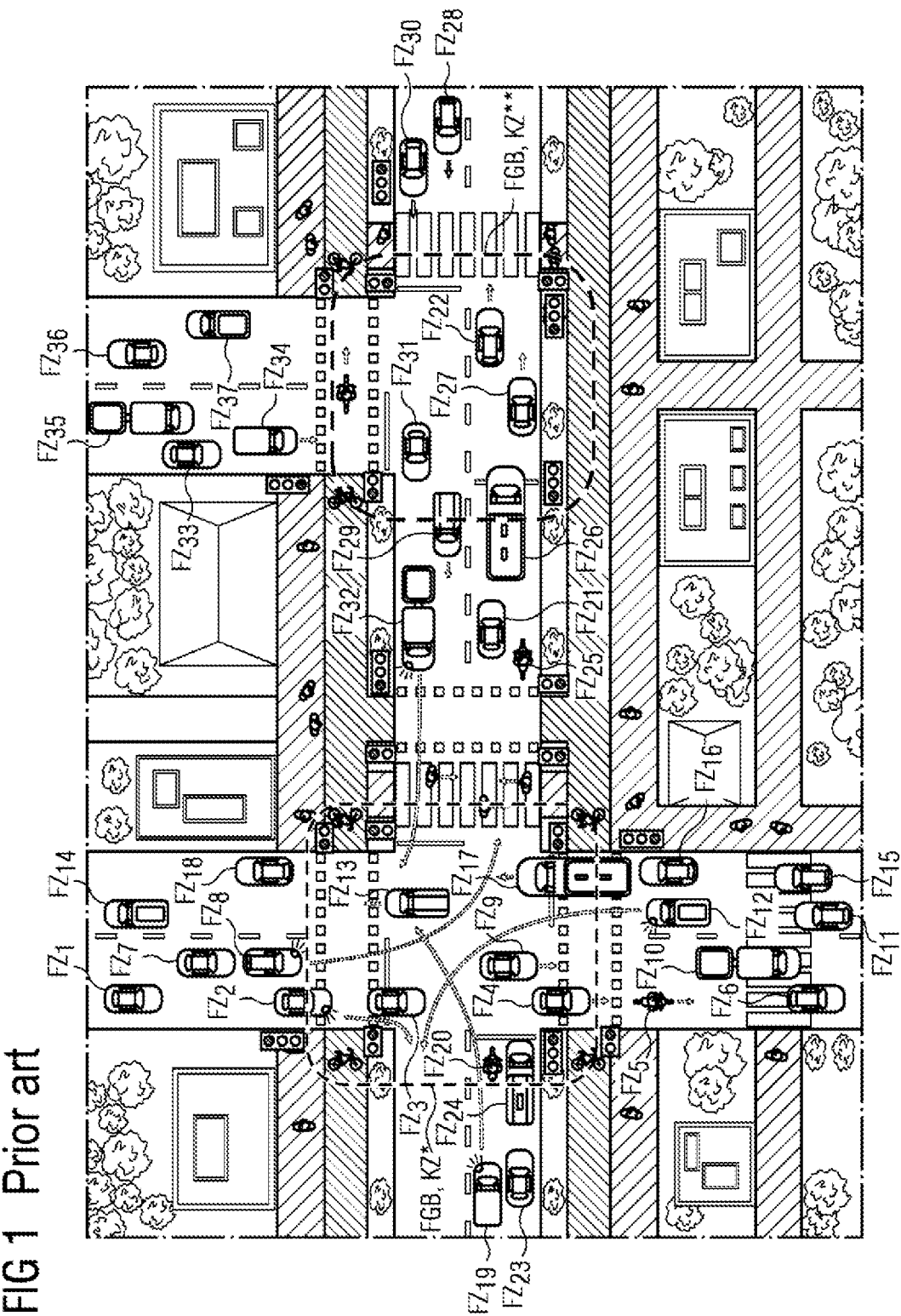
FIG. 1 depicts a control system for controlling at least partly automated vehicles in a roadway danger zone, in particular intersections of roadways in road traffic.
Figure 2B:
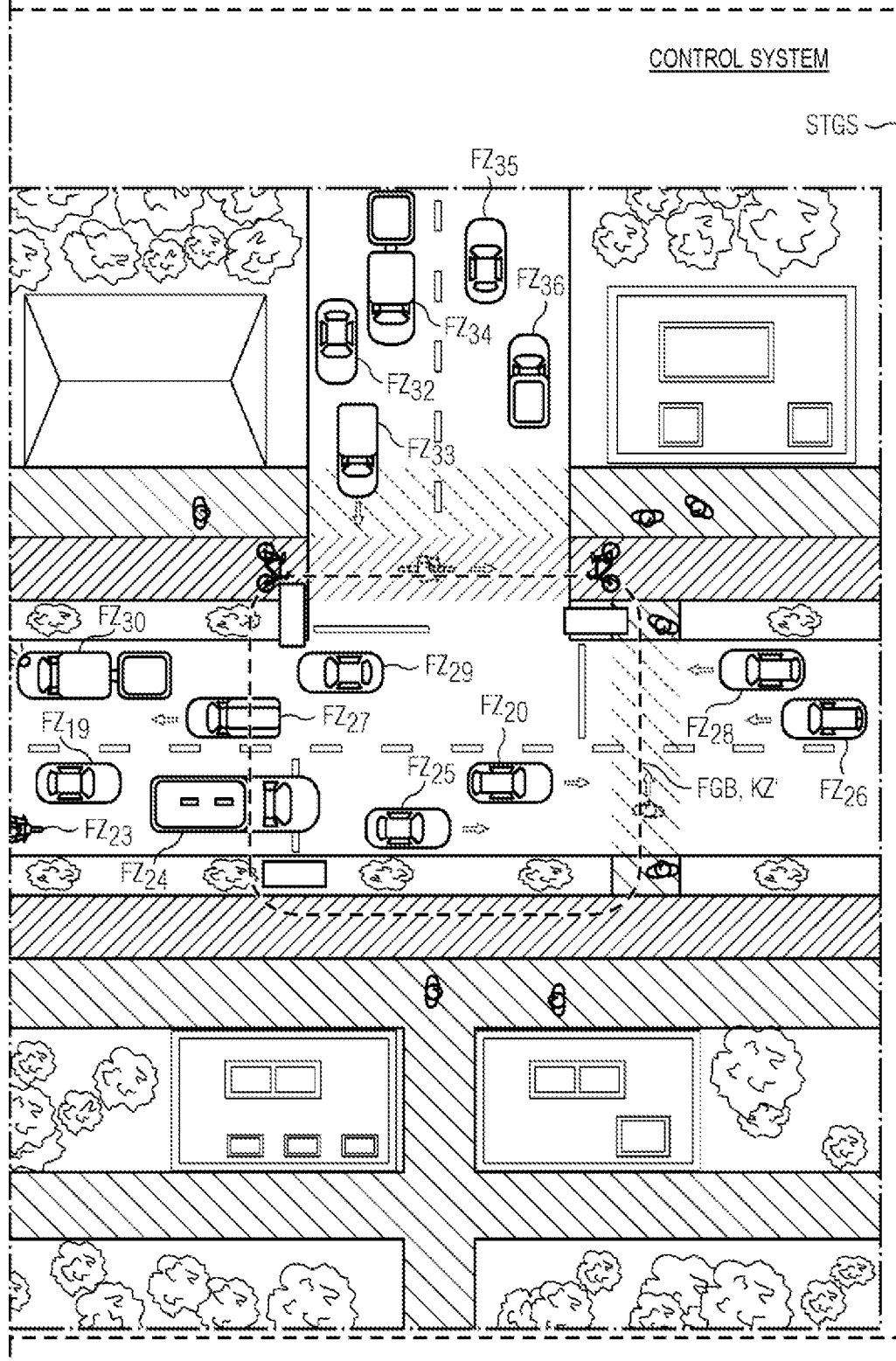
FIG. 2B depicts, on the basis of FIG. 1, a control system for controlling at least partly automated vehicles in a roadway danger zone, in particular intersections of roadways in road traffic.

FIGS. 2A and 2B show, on the basis of FIG. 1, the future situation—modified vis-à-vis the present-day situation—during regulation of roadway traffic, e.g. road traffic, in the roadway danger zones FGB in the form of a "double-T" intersection KZ or a "T" intersection KZ'. The modification consists in the fact that the road traffic is subdivided into at least partly automated and motorized road users and those which are not automated and, under certain circumstances, not motorized either, and the regulation of the roadway/road traffic in the roadway danger zones or intersections FGB, KZ, KZ' manages without any traffic regulation measures such as e.g. traffic lights, road signs, crosswalks for pedestrians, crossings for pedestrians/cyclists, etc. However, in order nevertheless to be able to regulate the roadway/road traffic in the danger/intersection zone FGB, KZ, KZ', in accordance with FIG. 2 a control system STGS is present for this purpose. In this control system STGS, the road users which are not automated and are motorized to a limited extent, such as pedestrians, cyclists, cyclists of electric bicycles, etc., are guided in the roadway danger zones FGB, KZ, KZ' for roadway crossing above or below the roadways for the at least partly automated and motorized road users.

In accordance with FIG. 2, corresponding bicycle and pedestrian crossings are placed and routed below the roadways in the danger/intersection zone FGB, KZ, KZ', which is illustrated by correspondingly dashed crossing sections in the danger/intersection zone FGB, KZ, KZ'. These precautions are e.g. some of the expensive construction measures mentioned in the paper in the online journal PLoS ONE 11(3): e0149607 and https://doi.org/10.1371/journal.pone.0149607.

Furthermore, the control system STGS illustrated in FIG. 2 for controlling a number n of at least partly automated, motorized vehicles $FZ_1 \ldots FZ_n$ where e.g. n=36 in the roadway danger zones or intersections FGB, KZ, KZ' contains at least one central control unit STGE.

The at least partly automated, motorized vehicles $FZ_1 \ldots F_{36}$ are distributed, in the manner illustrated, among the roadway danger zones FGB configured as "double-T" intersection KZ and as "T" intersection KZ'. For the vehicle control of at least partly automated, motorized vehicles in the roadway danger zone, in accordance with the explanations in association with the description of FIG. 1, only vehicles of classification levels "3" to "5" and possibly also those of level "2" are appropriate.

The central control unit STGE of the control system STGS illustrated by way of example in FIG. 2, in accordance with this illustration, is responsible exclusively for the vehicle control of at least partly automated, motorized vehicles in the roadway danger zone FGB configured as "double-T" intersection KZ. The vehicle control of the roadway danger zone FGB configured as "T" intersection KZ' and of any further roadway danger zone FGB in the control system STGS, neither being explicitly illustrated in FIG. 2, can be performed either also by the control unit STGE illustrated or else in each case by further control units (not illustrated).

The roadway danger zone FGB configured as "double-T" intersection KZ shall be considered in more specific detail hereinafter in a representative manner for the general vehicle control of at least partly automated, motorized vehicles in roadway danger zones of the control system STGS. In contrast to the "double-T" intersection KZ* in FIG. 1, a dynamically varying and continuously moving number of vehicles of the at least partly automated, motorized vehicles $FZ_1 \ldots F_{36}$, which once again as automobiles and trucks having different vehicle lengths and engine powers and also as motorcycle are moving in "WEST→EAST or EAST→WEST" vehicle movement directions and "NORTH→SOUTH or SOUTH→NORTH" vehicle movement directions, are moving toward the "double-T" intersection KZ, on the "double-T" intersection KZ, in the "double-T" intersection KZ and away from the "double-T" intersection KZ, specifically without any control by traffic lights, traffic signs, etc., and without resultant stop/start interruptions of the traffic flow as still occur in the case of the traffic regulation in accordance with FIG. 1. This control in the control system STGS is now intended to be effected by the central control unit STGE.

For this vehicle control the central control unit STGE has a control device STER and at least one communication device KOER, which in terms of communication technology are either connected to one another or assigned to one another.

In accordance with the "or" option, the control device STER is and advantageously embodied as an open cloud computing platform.

The communication device KOER is a radiocommunication device designed for the mobile radio standard of the fifth generation (5G) and in both cases ("either" option and "or" option) is arranged in the roadway danger zone FGB, configured as "double-T" intersection KZ, in terms of number and arrangement technology in such a way that the danger/intersection zone FGB, KZ is covered optimally in terms of radiotechnology, specifically such that the at least partly automated, motorized vehicles situated in the danger/intersection zone FGB, KZ are reachable and addressable via radio at any time for vehicle control. For the danger/intersection zone FGB, KZ illustrated, there are for example four individual communication devices or radio communication devices KOER positioned at all four corners of the intersection in order always to have an optimum radio connection to the vehicles in the danger/intersection zone FGB, KZ.

In a representative manner for all vehicles $FZ_i$ which must be reachable and addressable for vehicle control in the danger/intersection zone FGB, vehicles $FZ_2$, $FZ_{11}$, $FZ_{14}$, $FZ_{15}$, $FZ_{18}$, $FZ_{22}$, $FZ_{31}$ of the at least partly automated, motorized vehicles $FZ_1 \ldots F_{36}$ shall be considered hereinafter for the explanation of the vehicle control by the central control unit STGE. For the reachability and addressability of the vehicles $FZ_2$, $FZ_{11}$, $FZ_{14}$, $FZ_{15}$, $FZ_{18}$, $FZ_{22}$, $FZ_{31}$ considered, these vehicles each have a vehicle communication interface FZKS, which, like the radio communication device KOER, is a vehicle radio communication interface designed for the mobile radio standard of the 5th generation (5G).

Each vehicle $FZ_1$—in general—and the vehicles $FZ_2$, $FZ_{11}$, $FZ_{14}$, $FZ_{15}$, $FZ_{18}$, $FZ_{22}$, $FZ_{31}$ considered—in particular—of the at least partly automated, motorized vehicles $FZ_1 \ldots F_{36}$, when approaching the danger/intersection zone FGB, KZ in order to pass through the roadway danger zone FGB or the "double-T" intersection KZ, surrender(s) a vehicle control power for vehicle control of dynamic driving tasks in the respective vehicle.

As a result of temporarily surrendering the vehicle control power for passing through the roadway danger zone FGB or the "double-T" intersection KZ, said vehicle cedes control sovereignty with regard to crossing the danger/intersection zone FGB, KZ to an external central control entity, here the central control unit STGE. Depending on the autonomy level for autonomous driving, this means that the driver of the vehicle ceding control sovereignty no longer has power and control over said driver's own vehicle KZ and said driver is then at best only an assisting agent as far as the vehicle control of the dynamic driving tasks in the vehicle for crossing the danger/intersection zone FGB, KZ is concerned.

The expression "approach" is taken to mean that the vehicle must have surrendered the vehicle control power in good time before the vehicle enters the danger/intersection zone FGB, KZ, because otherwise collision-free vehicle control in the danger/intersection zone FGB, KZ cannot be ensured. In order to extend the buffer zone for surrendering the vehicle control power, it is advantageous if already in advance of approaching, the surrender of the vehicle control power is agreed by means of a handshake protocol between each vehicle $FZ_i$, $FZ_2$, $FZ_{11}$, $FZ_{14}$, $FZ_{15}$, $FZ_{18}$, $FZ_{22}$, $FZ_{31}$ and the central control entity or the control unit STGE. This agreement by way of "handshake protocol" is effected in terms of communication technology by way of the radio connection firstly between the vehicle communication interface or vehicle radio communication interface FZKS and the communication device or radiocommunication device KOER and secondly between the communication device KOER and the control device STER.

The vehicle control power is in each case surrendered here with the aid of first control data $STGD_1$ communicated by each vehicle $FZ_i$, $FZ_2$, $FZ_{11}$, $FZ_{14}$, $FZ_{15}$, $FZ_{18}$, $FZ_{22}$, $FZ_{31}$ upon approaching the danger/intersection zone FGB, KZ, or in advance of approaching, by way of communication technology via the abovementioned transfer path to the control device STER in the central control unit STGE. If the surrender of the vehicle control power is agreed already in advance of approaching, said first control data $STGD_1$ are communicated to the control device STER in the central control unit STGE in the course of the handshake protocol.

Figure 3:
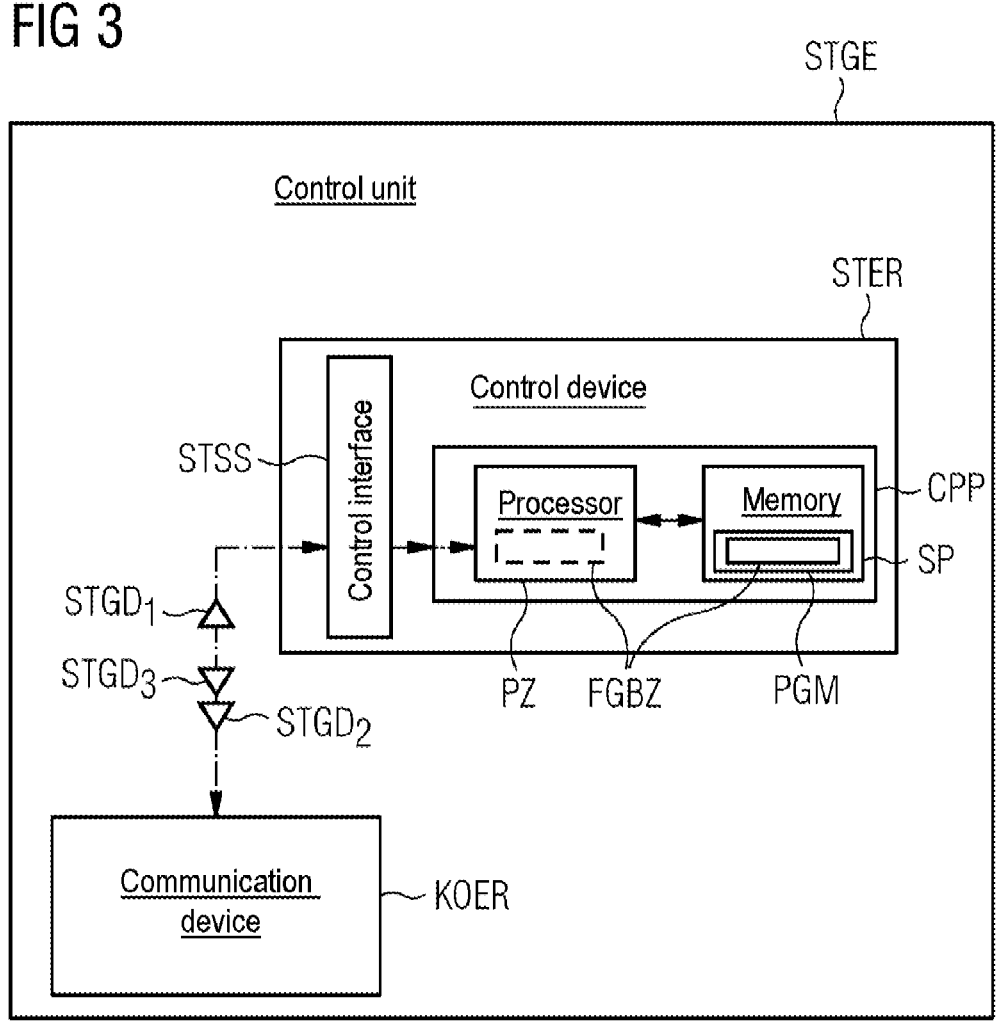
FIG. 3 depicts the basic construction of a control device in a control unit of the control system illustrated in FIG. 2 for vehicle control by generation of a roadway danger zone twin.

FIG. 3 shows the basic construction of the control device STER in the control unit STGE of the control system STGS illustrated in FIG. 2 for vehicle control by generating a roadway danger zone twin FGBZ. The control device STER has a control interface STSS and a computer program product CPP for vehicle control of the at least partly automated, motorized vehicles $FZ_i$, $FZ_2$, $FZ_{11}$, $FZ_{14}$, $FZ_{15}$, $FZ_{18}$, $FZ_{22}$, $FZ_{31}$ in the danger/intersection zone FGB, KZ. The computer program product CPP contains a nonvolatile, readable memory SP, in which processor-readable control program instructions of a program module PGM that carries out the vehicle control are stored, and a processor PZ, which is connected to the memory SP and which executes the control program instructions of the program module PGM for vehicle control and is connected to the control interface STSS.

Once the vehicles $FZ_i$, $FZ_2$, $FZ_{11}$, $FZ_{14}$, $FZ_{15}$, $FZ_{18}$, $FZ_{22}$, $FZ_{31}$ have surrendered the vehicle control powers, the first control data $STGD_1$ corresponding thereto, which are generated by the vehicles $FZ_i$, $FZ_2$, $FZ_{11}$, $FZ_{14}$, $FZ_{15}$, $FZ_{18}$, $FZ_{22}$, $FZ_{31}$ and are communicated to the control device STER, pass into the processor PZ via the communication device KOER and the control interface STSS. The processor PZ, having obtained the first control data $STGD_1$ and with the vehicles $FZ_i$, $FZ_2$, $FZ_{11}$, $FZ_{14}$, $FZ_{15}$, $FZ_{18}$, $FZ_{22}$, $FZ_{31}$ having surrendered the vehicle control powers, thereupon generates the digital roadway danger zone twin FGBZ, by means of which, owing to the vehicle control powers having been surrendered, vehicle movements of the vehicles $FZ_i$, $FZ_2$, $FZ_{11}$, $FZ_{14}$, $FZ_{15}$, $FZ_{18}$, $FZ_{22}$, $FZ_{31}$ for passing through the roadway danger zone FGB or the "double-T" intersection KZ are controlled automatically, dynamically, in a vehicle-coordinated manner and in a vehicle-collision-free manner.

For this purpose, the processor PZ generates second control data $STGD_2$ on the basis of the digital roadway danger zone twin FGBZ generated, which second control data pass via the control interface STSS into the communication device KOER or the radiocommunication device KOER and pass from there in accordance with the illustration in FIG. 2 via the vehicle communication interface or vehicle radiocommunication interface FZKS ultimately into the vehicles $FZ_i$, $FZ_2$, $FZ_{11}$, $FZ_{14}$, $FZ_{15}$, $FZ_{18}$, $FZ_{22}$, $FZ_{31}$ whereby the latter are controlled for passing through the roadway danger zone FGB or the "double-T" intersection KZ.

For the generation of the digital roadway danger zone twin FGBZ for vehicle control, the processor PZ, during the execution of the program module PGM, ascertains vehicle trajectory and vehicle speed of each vehicle $FZ_i$, $FZ_2$, $FZ_{11}$, $FZ_{14}$, $FZ_{15}$, $FZ_{18}$, $FZ_{22}$, $FZ_{31}$ owing to the vehicle control powers having been surrendered by the vehicles $FZ_i$, $FZ_2$, $FZ_{11}$, $FZ_{14}$, $FZ_{15}$, $FZ_{18}$, $FZ_{22}$, $FZ_{31}$ and with the use of the communication path between said vehicles and the control device STER or the computer program product CPP.

With the aid of the generated digital roadway danger zone twin FGBZ for vehicle control, the processor PZ, during the execution of the program module PGM, ascertains which vehicles have passed through the roadway danger zone FGB or the "double-T" intersection KZ. These are the vehicles $FZ_i$, $FZ_3$, $FZ_{16}$ in accordance with the illustration in FIG. 2. The vehicle control powers surrendered by these vehicles $FZ_i$, $FZ_3$, $FZ_{16}$ in order to pass through the roadway danger zone FGB or the "double-T" intersection KZ are returned to each vehicle $FZ_i$, $FZ_3$, $FZ_{16}$ by means of third control data $STGD_3$ generated by the processor PZ and transferred via the existing communication path between these vehicles and the control device STER or the computer program product CPP. In this case, the transfer of the third control data $STGD_3$ takes place in the course of a further handshake protocol between the control device STER via the communication device KOER and the vehicle $FZ_i$, $FZ_3$, $FZ_{16}$.

An explanation is given below, with reference to FIG. 4, of how then with the aid of the generated digital roadway danger zone twin FGBZ for vehicle control firstly the vehicle movements of the vehicles $FZ_i$, $FZ_2$, $FZ_{11}$, $FZ_{14}$, $FZ_{15}$, $FZ_{18}$, $FZ_{22}$, $FZ_{31}$ for passing through the roadway danger zone FGB or the "double-T" intersection KZ are controlled automatically, dynamically, in a vehicle-coordinated manner and in a vehicle-collision-free manner and then the fact of when a vehicle has passed through the roadway danger zone FGB or the "double-T" intersection KZ is subsequently recognized and ascertained.

Figure 4:
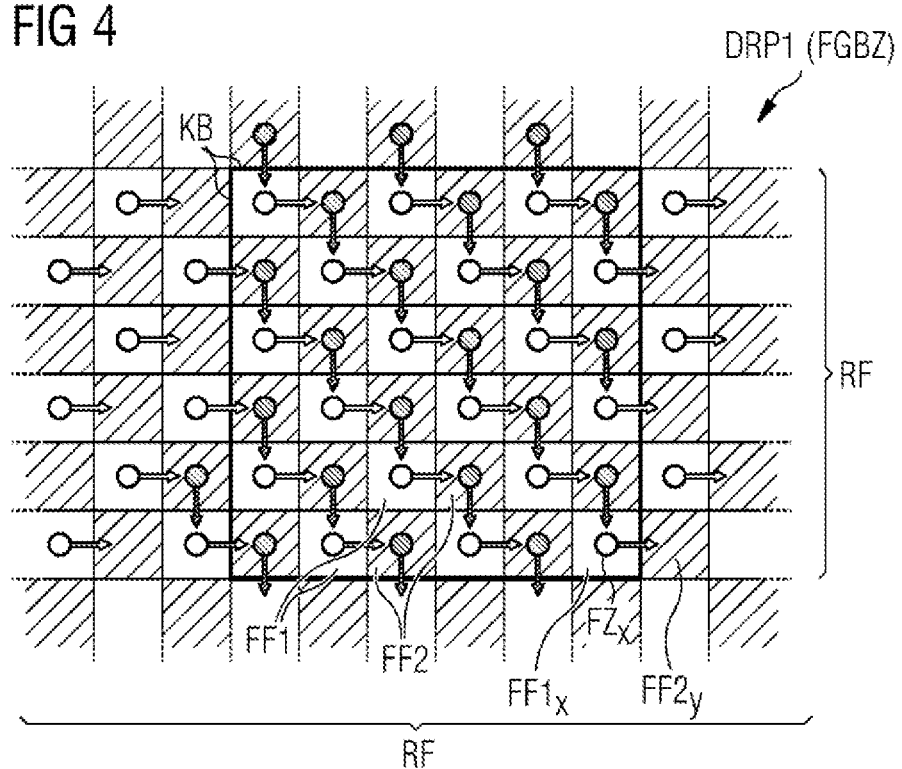
FIG. 4 depicts a first digital representation—created by the roadway danger zone twin upon the generation thereof in the control device or the computer program product according to FIG. 3—of a first traffic situation with a roadway danger zone in the form of a "double-T" intersection that is completely occupied by at least partly automated, motorized vehicles traversing it.

FIG. 4 shows a first digital representation DRP1—created by the roadway danger zone twin FGBZ upon the generation thereof in the control device STER or the computer program product CPP—of a first traffic situation with a roadway danger zone in the form of a "double-T" intersection that is completely occupied by at least partly automated, motorized vehicles traversing it.

The first traffic situation here has nothing to do with the traffic situation in the danger/intersection zone FGB, KZ illustrated in FIG. 2. Rather, the first digital representation DPR1 illustrated in FIG. 4 is intended very generally to elucidate how vehicle movements of the at least partly automated, motorized vehicles completely occupying and traversing the "double-T" intersection, for the purpose of passing through the latter, are controlled automatically, dynamically, in a vehicle-coordinated manner and in a vehicle-collision-free manner.

The first digital representation DRP1 is a grid format RF having format fields FF1, FF2 alternating in checkered fashion, wherein a core zone KB of the grid format RF represents the "double-T" intersection, first format fields FF1 of the grid format RF, in a manner depending on format field alternation, represent either "WEST→EAST and/or EAST→WEST" vehicle movement directions or "NORTH→SOUTH and/or SOUTH→NORTH" vehicle movement directions with in each case at most one vehicle per first format field FF1, and second format fields FF2 of the grid format RF, in a manner depending on format field alternation, represent either "NORTH→SOUTH and/or SOUTH→NORTH" vehicle movement directions or "WEST→EAST and/or EAST→WEST" vehicle movement directions with in each case at most one vehicle per second format field FF2.

Vehicle travel information regarding the first traffic situation, from and in which directions of travel the vehicles for passing through the "double-T" intersection are moving toward the latter is represented digitally in the grid format RF having the format fields FF1, FF2 alternating in checkered fashion.

In accordance with the first traffic situation illustrated in FIG. 4, 30 vehicles, represented by white circles in the first format fields FF1, are moving digitally and unidirectionally in the EAST→WEST direction and 22 vehicles, represented by black circles in the second format fields FF2, are moving digitally and unidirectionally in the NORTH→SOUTH direction and that is uniformly in the entire grid format RF, wherein the double arrows at the white circles and the arrows at the black circles always indicate the respective direction of movement.

In relation to the "double-T" intersection traffic in FIG. 2, this means that the 52 vehicles, 30 in the EAST→WEST direction and 22 in the NORTH→SOUTH direction, are all traveling straight on and not turning off and changing roadway and direction of travel, thus e.g. changing to the EAST→WEST direction when coming from the NORTH→SOUTH direction, that is to say turning off left.

Instances of vehicles turning off are special cases with regard to said vehicle control in the danger/intersection zone, which are dealt with in the European patent application (application No. 18214067.3-1012) entitled "Method, computer program product, central control unit and control system for controlling at least partly automated vehicles, proportionately having intentions to change roadways, in a roadway danger zone, in particular intersections of roadways in road traffic".

The format fields FF1, FF2 of the grid format RF of the first digital representation DRP1 are chosen such that vehicles having a normal, customary and defined vehicle length in the state of rest and state of movement are represented digitally without touching one another in the fields.

Vehicles that exceed said normal, customary and defined vehicle length, that is to say are larger, constitute further special cases with regard to said vehicle control in the danger/intersection zone. These special cases are dealt with in the European patent application (application No. 18214065.7-1203) entitled "Method, computer program product, central control unit and control system for controlling at least partly automated vehicles, proportionately having excessive vehicle lengths, in a roadway danger zone, in particular intersections of roadways in road traffic".

The first traffic situation in accordance with FIG. 4, applied to the "double-T" intersection traffic in FIG. 2, means that two roadway directions having in each case 6 parallel lanes, roadway having 6 parallel lanes in the EAST→WEST direction and roadway having 6 parallel lanes in the NORTH→SOUTH direction, intersect and in the intersection zone, corresponding to the core zone KB of the grid format RF (checkerboard having 36 fields), 18 vehicles in each case are traveling in the EAST→WEST direction and NORTH→SOUTH direction.

For vehicle control in the "double-T" intersection traffic, each vehicle movement of the 36 vehicles for passing through the "double-T" intersection is controlled automatically, dynamically, in a vehicle-coordinated manner and in a vehicle-collision-free manner by virtue of the fact that in a manner corresponding thereto each vehicle of the 36 vehicles in the core zone KB of the grid format RF in accordance with a digital movement with a START point and a TARGET point in the grid format RF, which digital movement is based on a format field alternation, is digitally moved either from a first format field of the first format fields FF1 as the START point of the digital movement to a neighboring second format field of the second format fields FF2 as the TARGET point of the digital movement, which second format field does not represent any vehicle of the 36 vehicles—that is to say is digitally free for the digital movement—, or from a second format field of the second format fields FF2 as the START point of the digital movement to a neighboring first format field of the first format fields FF1 as the TARGET point of the digital movement, which first format field does not represent any vehicle of the 36 vehicles—that is to say is digitally free for the digital movement.

Therefore, with regard to the 36 vehicles in the core zone KB a finite chain reaction of successive digital movements takes place, which has its beginning, e.g. on the basis of FIG. 4, with a first digital movement from a format field $FF1_x$ of the first format fields FF1, which represents a vehicle $FZ_x$ as START point to a format field $FF2_y$ of the second format fields FF2 as TARGET point, which does not represent any vehicle, that is to say is digitally free, and which has its end when all 36 vehicles which were in the core zone KB of the grid format RF at the beginning have left the core zone KB of the grid format RF.

In this state when with a last digital movement in the grid format RF the 36 vehicles have digitally left the core zone KB of the grid format RF and have thus passed through the "double-T" intersection, the vehicle control power is returned to each vehicle by the control device STER or the computer program product CPP transferring the third control data $STGD_3$ to the respective vehicle via the described communication path, in accordance with FIG. 3.

This can be achieved simply and advantageously with the aid of the further handshake protocol, in accordance with the description concerning FIG. 3.

Figure 5:
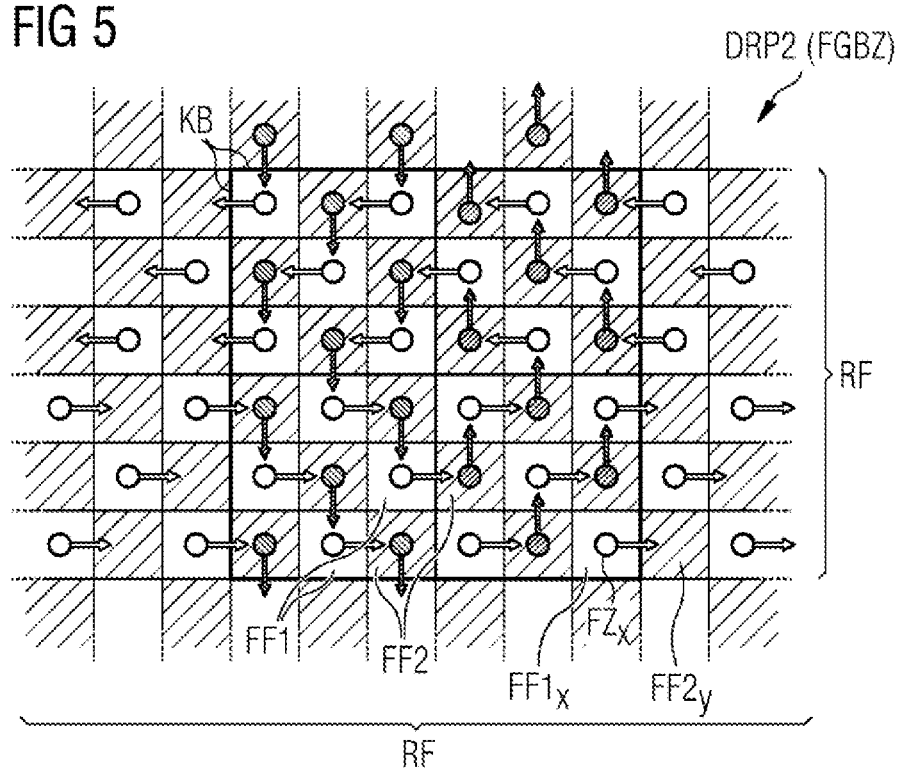
FIG. 5 depicts a second digital representation—created by the roadway danger zone twin upon the generation thereof in the control device or the computer program product according to FIG. 3—of a second traffic situation with a roadway danger zone in the form of a "double-T" intersection that is completely occupied by at least partly automated, motorized vehicles traversing it.

FIG. 5 shows—as in FIG. 4—a second digital representation DRP2—created by the roadway danger zone twin FGBZ upon the generation thereof in the control device STER or the computer program product CPP according to FIG. 3—of a second traffic situation with a roadway danger zone in the form of a "double-T" intersection that is completely occupied by at least partly automated, motorized vehicles traversing it.

The second traffic situation, too, has nothing to do with the traffic situation in the danger/intersection zone FGB, KZ illustrated in FIG. 2. The second digital representation DPR2 illustrated in FIG. 5 is also intended once again very generally to elucidate how movements of the at least partly automated, motorized vehicles completely occupying and traversing the "double-T" intersection, for the purpose of passing through the latter, are controlled automatically, dynamically, in a vehicle-coordinating manner and in a vehicle-collision-free manner.

The second digital representation DRP2 also again has the grid format RF having the format fields FF1, FF2 alternating in checkered fashion, wherein
the core zone KB of the grid format RF represents the "double-T" intersection, the first format fields FF1 of the grid format RF, in a manner depending on format field alternation, represent either
the "WEST→EAST and/or EAST→WEST" vehicle movement directions or
the "NORTH→SOUTH and/or SOUTH→NORTH" vehicle movement directions with in each case once again at most one vehicle per first format field FF1, and
the second format fields FF2 of the grid format RF, in a manner depending on format field alternation, represent either
the "NORTH→SOUTH and/or SOUTH→NORTH" vehicle movement directions or
the "WEST→EAST and/or EAST→WEST" vehicle movement directions with in each case once again at most one vehicle per second format field FF2.

Vehicle travel information regarding the second traffic situation, from and in which directions of travel the vehicles for passing through the "double-T" intersection are moving toward the latter is represented digitally in the grid format RF having the format fields FF1, FF2 alternating in checkered fashion.

In accordance with the second traffic situation illustrated in FIG. 5, 32 vehicles, represented by white circles in the first format fields FF1, are moving digitally and bidirectionally, 17 vehicles thereof in the EAST→WEST direction and 15 vehicles thereof in the WEST→EAST direction, and 21 vehicles, represented by black circles in the second format fields FF2, are moving digitally and bidirectionally, 11 vehicles thereof in the NORTH→SOUTH direction and 10 vehicles thereof in the SOUTH→NORTH direction, and that is uniformly in the entire grid format RF, wherein the double arrows at the white circles and the arrows at the black circles always indicate the respective direction of movement. In relation to the "double-T" intersection traffic in FIG. 2, this means that the 53 vehicles, 32 in the EAST↔WEST direction and 21 in the NORTH↔SOUTH direction, are all—like the 51 vehicles in FIG. 4—traveling straight on and not turning off and changing roadway and direction of travel, thus e.g. changing to the EAST→WEST direction when coming from the NORTH→SOUTH direction, that is to say turning off to the left. With regard to problems in respect of turning off and vehicle lengths, reference is made to the stated patent applications cited above.

In contrast to the first traffic situation in FIG. 4, the second traffic situation in FIG. 5 is characterized by four roadway directions having in each case 3 parallel lanes situated next to one another—one roadway having 3 parallel lanes situated next to one another in the EAST→WEST direction, one roadway having 3 parallel lanes situated next to one another in the opposite direction, in the WEST→EAST direction, one roadway having 3 parallel lanes situated next to one another in the NORTH→SOUTH direction, and one roadway having 3 parallel lanes situated next to one another in the opposite direction, in the SOUTH→NORTH direction, which intersect, and wherein in the intersection zone—corresponding to the core zone KB of the grid format RF (checkerboard having 36 fields)—9 vehicles in each case are traveling in the EAST→WEST direction, in the WEST→EAST direction, in the NORTH→SOUTH direction and in the SOUTH→NORTH direction.

For vehicle control in the "double-T" intersection traffic, each vehicle movement of the 36 vehicles for passing through the "double-T" intersection is controlled automatically, dynamically, in a vehicle-coordinated manner and in a vehicle-collision-free manner by virtue of the fact that in a manner corresponding thereto
once again each vehicle of the 36 vehicles in the core zone KB of the grid format RF in accordance with a digital movement with the START point and the TARGET point in the grid format RF, which digital movement is based on the format field alternation, is digitally moved either
from a first format field of the first format fields FF1 as the START point of the digital movement to the neighboring second format field of the second format fields FF2 as the TARGET point of the digital movement, which second format field does not represent any vehicle of the 36 vehicles—that is to say is digitally free for the digital movement—, or
from the second format field of the second format fields FF2 as the START point of the digital movement to the neighboring first format field of the first format fields FF1 as the TARGET point of the digital movement, which first format field does not represent any vehicle of the 36 vehicles—that is to say is digitally free for the digital movement.

Therefore, with regard to the 36 vehicles in the core zone KB once again the finite chain reaction of successive digital movements takes place, which has its beginning, e.g. on the basis of FIG. 5, with the first digital movement from the format field $FF1_x$, of the first format fields FF1, which represents the vehicle $FZ_x$, as START point to the format field $FF2_y$, of the second format fields FF2 as TARGET point, which does not represent any vehicle, that is to say is digitally free, and which has its end when all 36 vehicles which were in the core zone KB of the grid format RF at the beginning have left the core zone KB of the grid format RF.

In this state when with a last digital movement in the grid format RF the 36 vehicles have digitally left the core zone KB of the grid format RF and have thus passed through the "double-T" intersection, the vehicle control power is returned to each vehicle once again by the control device STER or the computer program product CPP transferring the third control data $STGD_3$ to the respective vehicle via the described communication path, in accordance with FIG. 3.

This can be achieved simply and advantageously with the aid of the further handshake protocol, in accordance with the description concerning FIG. 3.

Figure 6:
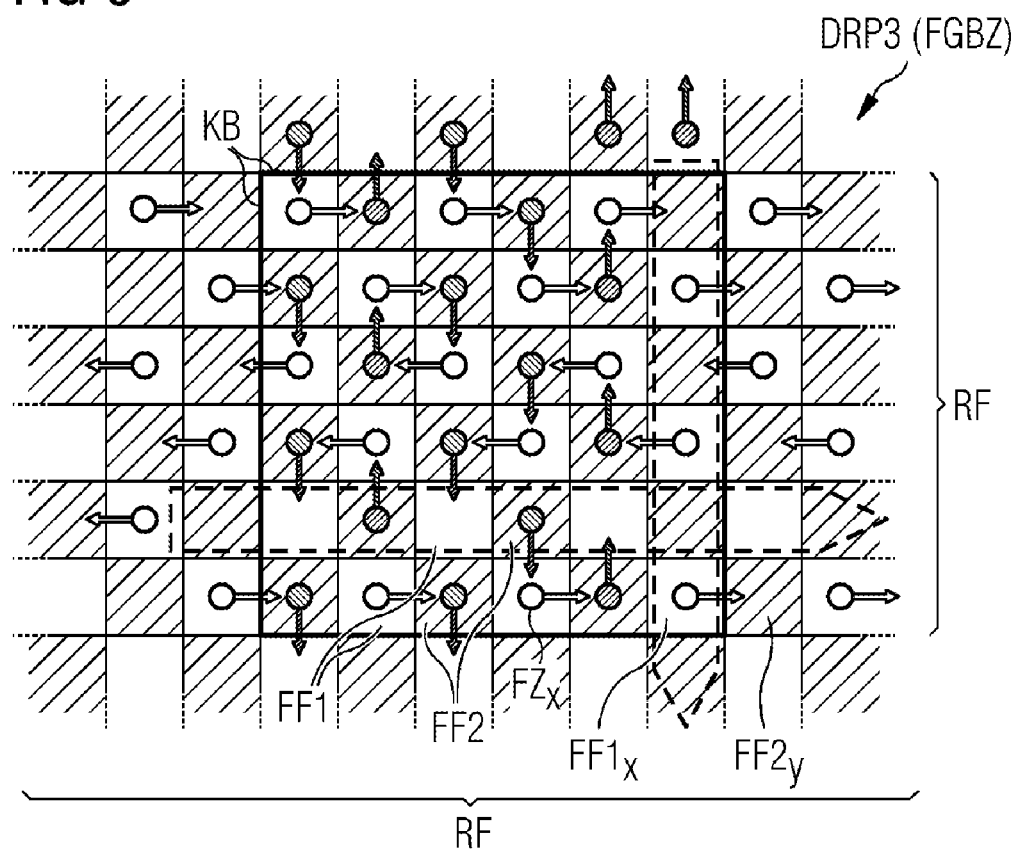
FIG. 6 depicts a third digital representation—created by the roadway danger zone twin upon the generation thereof in the control device or the computer program product according to FIG. 3—of a third traffic situation with a roadway danger zone in the form of a "double-T" intersection that is completely occupied by at least partly automated, motorized vehicles traversing it.

FIG. 6 shows—as in FIGS. 4 and 5—a third digital representation DRP3—created by the roadway danger zone twin FGBZ upon the generation thereof in the control device STER or the computer program product CPP according to FIG. 3—of a third traffic situation with a roadway danger zone in the form of a "double-T" intersection that is completely occupied by at least partly automated, motorized vehicles traversing it.

The third traffic situation, too—like the first and second traffic situations—has nothing to do with the traffic situation in the danger/intersection zone FGB, KZ illustrated in FIG. 2. The third digital representation DPR3 illustrated in FIG. 6 is also intended once again very generally to elucidate how movements of the at least partly automated, motorized vehicles completely occupying and traversing the "double-T" intersection, for the purpose of passing through the latter, are controlled automatically, dynamically, in a vehicle-coordinating manner and in a vehicle-collision-free manner.

The third digital representation DRP3 also again has the grid format RF having the format fields FF1, FF2 alternating in checkered fashion, wherein
- the core zone KB of the grid format RF represents the "double-T" intersection, the first format fields FF1 of the grid format RF, in a manner depending on format field alternation, represent either
  - the "WEST→EAST and/or EAST→WEST" vehicle movement directions or
  - the "NORTH→SOUTH and/or SOUTH→NORTH" vehicle movement directions with in each case once again at most one vehicle per first format field FF1, and
- the second format fields FF2 of the grid format RF, in a manner depending on format field alternation, represent either
  - the "NORTH→SOUTH and/or SOUTH→NORTH" vehicle movement directions or
  - the "WEST→EAST and/or EAST→WEST" vehicle movement directions with in each case once again at most one vehicle per second format field FF2.

Vehicle travel information regarding the second traffic situation, from and in which directions of travel the vehicles for passing through the "double-T" intersection are moving toward the latter is represented digitally in the grid format RF having the format fields FF1, FF2 alternating in checkered fashion.

In accordance with the third traffic situation illustrated in FIG. 6,—as in FIG. 4—26 vehicles, represented by white circles in the first format fields FF1, are moving digitally and bidirectionally, 15 vehicles thereof in the EAST→WEST direction and 11 vehicles thereof in the WEST→EAST direction, and 19 vehicles, represented by black circles in the second format fields FF2, are moving digitally and bidirectionally, 11 vehicles thereof in the NORTH→SOUTH direction and 8 vehicles thereof in the SOUTH→NORTH direction, and that is uniformly in the entire grid format RF, wherein the double arrows at the white circles and the arrows at the black circles always indicate the respective direction of movement. In relation to the "double-T" intersection traffic in FIG. 2, this means that the 45 vehicles, 26 in the EAST↔WEST direction and 19 in the NORTH↔SOUTH direction, are all—like the 51 vehicles in FIG. 4 and the 53 vehicles in FIG. 5—traveling straight on and not turning off and changing roadway and direction of travel, thus e.g. changing to the EAST→WEST direction when coming from the NORTH→SOUTH direction, that is to say turning off to the left. With regard to problems in respect of turning off and vehicle lengths, reference is made to the stated parallel patent applications.

In contrast to the second traffic situation in FIG. 5, the third traffic situation in FIG. 6 is characterized by four roadway directions having in each case 3 parallel lanes not all situated next to one another—one roadway having 3 parallel lanes not all situated next to one another in the EAST→WEST direction, one roadway having 3 parallel lanes not all situated next to one another in the opposite direction, in the WEST→EAST direction, one roadway having 3 parallel lanes not all situated next to one another in the NORTH→SOUTH direction, and one roadway having 3 parallel lanes not all situated next to one another in the opposite direction, in the SOUTH→NORTH direction, which intersect, and wherein in the intersection zone—corresponding to the core zone KB of the grid format RF (checkerboard having 36 fields)—9 vehicles are traveling in the EAST→WEST direction, 6 vehicles are traveling in the WEST→EAST direction, 9 vehicles are traveling in the NORTH→SOUTH direction and 6 vehicles are traveling in the SOUTH→NORTH direction.

A further difference with respect to the second traffic situation with the second digital representation DRP2 in FIG. 5 is that in the case of the third digital representation DRP6 in accordance with FIG. 6, for one lane of the three lanes in the SOUTH→NORTH direction and one lane of the three lanes in the WEST→EAST direction a change of direction is in each case provided by virtue of the fact that in the core zone KB of the third digital representation DRP6 the format fields FF1, FF2 for the respective lane with the vehicle traffic in the SOUTH→NORTH direction and WEST→EAST direction, respectively, are made free (dashed arrows in FIG. 6) and as soon as there is no longer any vehicle situated outside the core zone KB either—in relation to the situation in FIG. 2 there are no longer any vehicles situated in the corresponding lanes outside the danger/intersection zone FGB, KZ—the change of direction is performed in each case in the direction of the dashed arrow from SOUTH→NORTH to NORTH→SOUTH and from WEST→EAST to EAST→WEST, respectively, in the third digital representation DRP6.

For vehicle control in the "double-T" intersection traffic, each vehicle movement of the 30 vehicles for passing through the "double-T" intersection is controlled automatically, dynamically, in a vehicle-coordinated manner and in a vehicle-collision-free manner by virtue of the fact that in a manner corresponding thereto once again
- each vehicle of the 30 vehicles in the core zone KB of the grid format RF in accordance with the digital movement with the START point and the TARGET point in the grid format RF, which digital movement is based on the format field alternation, is digitally moved either
  - from the first format field of the first format fields FF1 as the START point of the digital movement to the neighboring second format field of the second format fields FF2 as the TARGET point of the digital movement, which second format field does not represent any vehicle of the 30 vehicles—that is to say is digitally free for the digital movement—, or
  - from the second format field of the second format fields FF2 as the START point of the digital movement to the neighboring first format field of the first format fields FF1 as the TARGET point of the digital movement, which first format field does not represent any vehicle of the 30 vehicles—that is to say is digitally free for the digital movement.

Therefore, with regard to the 30 vehicles in the core zone KB once again the finite chain reaction of successive digital movements takes place, which has its beginning, e.g. on the basis of FIG. 6, with the first digital movement from the format field $FF1_x$ of the first format fields FF1, which represents the vehicle $FZ_x$, as START point to the format field $FF2_y$ of the second format fields FF2 as TARGET point, which does not represent any vehicle, that is to say is digitally free, and which has its end when all 30 vehicles which were in the core zone KB of the grid format RF at the beginning have left the core zone KB of the grid format RF.

In this state when with a last digital movement in the grid format RF the 30 vehicles have digitally left the core zone KB of the grid format RF and have thus passed through the "double-T" intersection, the vehicle control power is returned to each vehicle once again by the control device STER or the computer program product CPP transferring the third control data $STGD_3$ to the respective vehicle via the described communication path, in accordance with FIG. 3.

This can be achieved simply and advantageously with the aid of the further handshake protocol, in accordance with the description concerning FIG. 3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for controlling at least partly automated vehicles in a roadway danger zone, the method comprising:
   a) each vehicle of the vehicles, upon approaching the roadway danger zone, surrenders a vehicle control power for vehicle control of dynamic driving tasks in order to pass through the roadway danger zone; and
   b) once the vehicles have surrendered the vehicle control powers, a central control entity generates a digital roadway danger zone twin, by means of which, owing to the vehicle control powers having been surrendered, vehicle movements of a vehicle for passing through the roadway danger zone are controlled automatically, dynamically, in a vehicle-coordinated manner and in a vehicle-collision-free manner.

2. The method as claimed in claim 1, wherein in advance of approaching the roadway danger zone, the surrender of the vehicle control power is agreed by means of a handshake protocol between each vehicle and the central control entity.

3. The method as claimed in claim 1, wherein vehicle trajectory and vehicle speed of each vehicle are ascertained for the generation of the digital roadway danger zone twin for vehicle control owing to the vehicle control powers having been surrendered.

4. The method as claimed in claim 1, wherein:
   a) with the generation of the digital roadway danger zone twin, vehicle travel information regarding from and in which travel directions the vehicles are moving toward the roadway danger zone in order to pass through the latter is represented digitally in a grid format having format fields alternating in a checkered fashion, wherein
      a1) a core zone of the grid format represents the roadway danger zone,
      a2) first format fields of the grid format, in a manner depending on format field alternation, represent either "WEST→EAST and/or EAST→WEST" vehicle movement directions
         or
         "NORTH→SOUTH and/or SOUTH→NORTH" vehicle movement directions
         with in each case at most one vehicle per first format field, and
      a3) second format fields of the grid format, in a manner depending on format field alternation, represent either "NORTH→SOUTH and/or SOUTH→NORTH" vehicle movement directions
         or
         "WEST→EAST and/or EAST→WEST" vehicle movement directions
         with in each case at most one vehicle per second format field; and
   b) each vehicle movement of the vehicle for passing through the roadway danger zone is controlled automatically, dynamically, in a vehicle-coordinated manner and in a vehicle-collision-free manner by virtue of the fact that in a manner corresponding thereto the vehicle in the core zone of the grid format in accordance with a digital movement with a START point and a TARGET point in the grid format, which digital movement is based on a format field alternation, is digitally moved either
      from a first format field of the first format fields as the START point of the digital movement to a neighboring second format field of the second format fields as the TARGET point of the digital movement, which second format field does not represent any vehicle of the vehicles—that is to say is digitally free for the digital movement—, or
      from a second format field of the second format fields as the START point of the digital movement to a neighboring first format field of the first format fields as the TARGET point of the digital movement, which first format field does not represent any vehicle of the vehicles—that is to say is digitally free for the digital movement.

5. The method as claimed in claim 4, wherein the vehicle control power is returned to each vehicle by the central control entity, in particular by means of a further handshake protocol, when with a last digital movement in the grid format the vehicle digitally leaves the core zone of the grid format and it has thus passed through the roadway danger zone.

6. A computer program product, comprising a computer readable hardware storage device having computer readable program code stored therein, said program code executable by a processor of a computer system to implement a method for controlling at least partly automated vehicles in a roadway danger zone, in particular intersections of roadways in road traffic, comprising a nonvolatile, readable memory, in which processor-readable control program instructions of a program module that carries out the vehicle control are stored, and a processor, which is connected to the memory and which executes the control program instructions of the program module for vehicle control, wherein the processor:

a) obtains first control data, with which each vehicle of the vehicles, upon approaching the roadway danger zone, surrenders a vehicle control power for vehicle control of dynamic driving tasks in order to pass through said zone, b) having obtained the first control data, and once the vehicles have surrendered the vehicle control powers, generates a digital roadway danger zone twin, by means of which, owing to the vehicle control powers having been surrendered and by means of second control data, vehicle movements of the vehicle for passing through the roadway danger zone are controllable automatically, dynamically, in a vehicle-coordinated manner and in a vehicle-collision-free manner.

7. The computer program product as claimed in claim 6, wherein the processor and the program module are embodied in such a way that vehicle trajectory and vehicle speed of each vehicle are ascertained for the generation of the digital roadway danger zone twin for vehicle control owing to the vehicle control powers having been surrendered.

8. The computer program product as claimed in claim 6, wherein the processor and the program module are embodied in such a way that:

a) with the generation of the digital roadway danger zone twin, vehicle travel information regarding from and in which travel directions the vehicles are moving toward the roadway danger zone in order to pass through the latter is represented digitally in a grid format having format fields alternating in a checkered fashion, wherein a1) a core zone of the grid format represents the roadway danger zone, a2) first format fields of the grid format, in a manner depending on format field alternation, represent either "WEST→EAST and/or EAST→WEST" vehicle movement directions or "NORTH→SOUTH and/or SOUTH→NORTH" vehicle movement directions with in each case at most one vehicle per first format field, and a3) second format fields of the grid format, in a manner depending on format field alternation, represent either "NORTH→SOUTH and/or SOUTH→NORTH" vehicle movement directions or "WEST→EAST and/or EAST→WEST" vehicle movement directions with in each case at most one vehicle per second format field; and b) each vehicle movement of the vehicle for passing through the roadway danger zone is controlled automatically, dynamically, in a vehicle-coordinated manner and in a vehicle-collision-free manner by virtue of the fact that in a manner corresponding thereto the vehicle in the core zone of the grid format in accordance with a digital movement with a START point and a TARGET point in the grid format, which digital movement is based on a format field alternation, is digitally moved either from a first format field of the first format fields as the START point of the digital movement to a neighboring second format field of the second format fields as the TARGET point of the digital movement, which second format field does not represent any vehicle of the vehicles—that is to say is digitally free for the digital movement—, or from a second format field of the second format fields as the START point of the digital movement to a neighboring first format field of the first format fields as the TARGET point of the digital movement, which first format field does not represent any vehicle of the vehicles—that is to say is digitally free for the digital movement.

9. The computer program product as claimed in claim 8, wherein the processor and the program module are embodied in such a way that the vehicle control power is returned to each vehicle by means of third control data when with a last digital movement in the grid format the vehicle digitally leaves the core zone of the grid format and it has thus passed through the roadway danger zone.

10. A central control unit for controlling at least partly automated vehicles in a roadway danger zone, in particular intersections of roadways in road traffic, wherein:

a control device comprising a computer program product having a nonvolatile, readable memory, in which processor-readable control program instructions of a program module that carries out the vehicle control are stored, and a processor, which is connected to the memory and which executes the control program instructions of the program module for vehicle control, and a control interface, and at least one communication device, which in terms of communication technology is connected to the control device and to the computer program product therein via the control interface or is assigned to the control device and the computer program product therein, wherein the control device and the communication device interact and are embodied with regard to the vehicle control in such a way that a) the communication device receives from each vehicle of the vehicles, when said vehicle is approaching the roadway danger zone in order to pass through the latter, first control data for the purpose of surrender of a vehicle control power for the vehicle control of dynamic driving tasks and forwards said data to the control device, b) the control device, having received the first control data and the vehicle control powers surrendered by the vehicles as a result, generates a digital roadway danger zone twin, by means of which, owing to the vehicle control powers having been surrendered, the control device, by means of second control data, via the communication device, controls vehicle movements of the vehicle for passing through the roadway danger zone automatically, dynamically, in a vehicle-coordinating manner and in a vehicle-collision-free manner.

11. The central control unit as claimed in claim 10, wherein the control device and the communication device interact and are embodied in such a way that in advance, when each vehicle is approaching the roadway danger zone, the surrender of the vehicle control power and the transmission of the message for surrender of the vehicle control power are agreed by means of a handshake protocol between the respective vehicle and the control device via the communication device.

12. The central control unit as claimed in claim 10, wherein the control device and the communication device interact and are embodied in such a way that the control device ascertains vehicle trajectory and vehicle speed of each vehicle for the generation of the digital roadway danger zone twin for vehicle control owing to the vehicle control powers via the communication device.

13. The central control unit as claimed in claim 10, wherein:
the control device and the communication device interact and are embodied in such a way that the control device
a) with the generation of the digital roadway danger zone twin digitally represents vehicle travel information regarding from and in which travel directions the vehicles are moving toward the roadway danger zone in order to pass through the latter in a grid format having format fields alternating in a checkered fashion, wherein
a1) a core zone of the grid format represents the roadway danger zone,
a2) first format fields of the grid format, in a manner depending on format field alternation, represent either "WEST→EAST and/or EAST→WEST" vehicle movement directions
or
"NORTH→SOUTH and/or SOUTH→NORTH" vehicle movement directions with in each case at most one vehicle per first format field, and
a3) second format fields of the grid format, in a manner depending on format field alternation, represent either "NORTH→SOUTH and/or SOUTH→NORTH" vehicle movement directions
or
"WEST→EAST and/or EAST→WEST" vehicle movement directions with in each case at most one vehicle per second format field; and
b) controls each vehicle movement of the vehicle for passing through the roadway danger zone automatically, dynamically, in a vehicle-coordinated manner and in a vehicle-collision-free manner by virtue of the fact that in a manner corresponding thereto
the vehicle in the core zone of the grid format in accordance with a digital movement with a START point and a TARGET point in the grid format, which digital movement is based on a format field alternation, is digitally moved either
from a first format field of the first format fields as the START point of the digital movement to a neighboring second format field of the second format fields as the TARGET point of the digital movement, which second format field does not represent any vehicle of the vehicles—that is to say is digitally free for the digital movement—, or
from a second format field of the second format fields as the START point of the digital movement to a neighboring first format field of the first format fields as the TARGET point of the digital movement, which first format field does not represent any vehicle of the vehicles—that is to say is digitally free for the digital movement.

14. The central control unit as claimed in claim 13, wherein the control device and the communication device interact and are embodied in such a way that the control device, via the communication device, by means of third control data, returns the vehicle control power to each vehicle, in particular by means of a further handshake protocol, when with a last digital movement in the grid format the vehicle digitally leaves the core zone of the grid format and it has thus passed through the roadway danger zone.

15. The central control unit as claimed in claim 10, wherein the control device is embodied as an open cloud computing platform.

16. A control system for controlling at least partly automated vehicles in a roadway danger zone, in particular intersections of roadways in road traffic, comprising at least one central control unit containing for the purpose of vehicle control in each case a control device and in each case at least one communication device, in particular in each case as claimed in claim 10, and a vehicle communication interface contained in each of the vehicles, which is connected to the communication device for the purpose of vehicle control, which control system is embodied for the purpose of vehicle control in the roadway danger zone.

* * * * *